United States Patent
Hamp

(12) 
(10) Patent No.: US 9,714,513 B2
(45) Date of Patent: Jul. 25, 2017

(54) ANTI-SLIP STEP TREATMENT

(75) Inventor: Jonathan Hamp, Adlington (GB)

(73) Assignee: Thermapply Limited, Adlington, Cheshire (GB)

( * ) Notice: Subject to any disclaimer, the term of this patent is extended or adjusted under 35 U.S.C. 154(b) by 0 days.

(21) Appl. No.: 14/237,940

(22) PCT Filed: Aug. 7, 2012

(86) PCT No.: PCT/GB2012/000639
§ 371 (c)(1),
(2), (4) Date: Jul. 22, 2014

(87) PCT Pub. No.: WO2013/021152
PCT Pub. Date: Feb. 14, 2013

(65) Prior Publication Data
US 2014/0338274 A1     Nov. 20, 2014

(30) Foreign Application Priority Data
Aug. 10, 2011 (GB) .................................. 1113722.1

(51) Int. Cl.
| | | |
|---|---|---|
| *E04F 11/02* | (2006.01) | |
| *B32B 37/04* | (2006.01) | |
| *E04F 11/17* | (2006.01) | |
| *B32B 15/08* | (2006.01) | |

(Continued)

(52) U.S. Cl.
CPC .............. *E04F 11/02* (2013.01); *B32B 15/08* (2013.01); *B32B 27/08* (2013.01); *B32B 37/04* (2013.01); *E04F 11/17* (2013.01); *E04F 15/02172* (2013.01); *B32B 2307/744* (2013.01); *B32B 2451/00* (2013.01); *B32B 2471/00* (2013.01)

(58) Field of Classification Search
CPC ..... E04F 11/02; E04F 11/17; E04F 15/02172; B32B 15/08; B32B 27/08; B32B 37/04; B32B 2307/744; B32B 2451/00; B32B 2471/00
USPC .................................................. 52/182, 741.2
See application file for complete search history.

(56) References Cited

U.S. PATENT DOCUMENTS

| | | | | |
|---|---|---|---|---|
| 2,009,966 | A | * | 7/1935 | Allen .............................. 428/150 |
| 2,106,399 | A | * | 1/1938 | Beaumont et al. ............. 52/177 |
| 2,899,288 | A | * | 8/1959 | Barclay .......................... 51/293 |

(Continued)

FOREIGN PATENT DOCUMENTS

| | | | | |
|---|---|---|---|---|
| GB | 2268748 | A | * 1/1994 | ................ C08J 3/20 |
| JP | 2002339536 | A | 11/2002 | |

(Continued)

OTHER PUBLICATIONS http://web.archive.org/web/20091125013853/http://flinttrading.com/products/premark/stormdrain.aspx, retrieved on May 28, 2015, 2 pages.

(Continued)

*Primary Examiner* — James Ference
(74) *Attorney, Agent, or Firm* — Dority & Manning, P.A.

(57) ABSTRACT

A method for providing an anti-slip surface for a step comprising providing a thin thermoplastic material sheet matrix and a design appliqué of a contrasting material or materials, applying the matrix and the appliqué to a step and heat fusing the matrix to the step and the appliqué to the matrix, and an appliqué used in such a method.

5 Claims, 3 Drawing Sheets

(51) Int. Cl.
*B32B 27/08* (2006.01)
*E04F 15/02* (2006.01)

(56) References Cited

U.S. PATENT DOCUMENTS

| | | | | |
|---|---|---|---|---|
| 3,030,251 A | * | 4/1962 | La Bore et al. | 428/40.1 |
| 3,308,725 A | * | 3/1967 | Nagin et al. | 404/20 |
| 3,895,981 A | * | 7/1975 | Tesch | A47G 27/06 |
| | | | | 156/256 |
| 4,196,243 A | * | 4/1980 | Sachs et al. | 428/147 |
| 4,401,050 A | * | 8/1983 | Britt et al. | 116/205 |
| 4,501,783 A | * | 2/1985 | Hiragami et al. | 428/147 |
| 4,622,257 A | * | 11/1986 | Thompson | 428/143 |
| 4,693,507 A | * | 9/1987 | Dresen | B60R 13/01 |
| | | | | 296/39.2 |
| 4,998,391 A | * | 3/1991 | Connew | 52/179 |
| 5,015,516 A | * | 5/1991 | Lussi et al. | 428/143 |
| 5,169,704 A | * | 12/1992 | Faust et al. | 428/143 |
| 5,357,724 A | * | 10/1994 | Sonoda | E04F 11/16 |
| | | | | 52/177 |
| 5,571,588 A | * | 11/1996 | Lussi et al. | 428/46 |
| 5,648,031 A | * | 7/1997 | Sturtevant et al. | 264/80 |
| 5,817,399 A | | 10/1998 | Kalman | |
| 5,861,206 A | * | 1/1999 | Jensen | G01K 1/02 |
| | | | | 116/207 |
| 5,888,612 A | * | 3/1999 | Needham | B29C 70/086 |
| | | | | 428/116 |
| 5,904,017 A | * | 5/1999 | Glatz et al. | 52/287.1 |
| 6,013,222 A | * | 1/2000 | Douglas et al. | 264/514 |
| 6,024,824 A | * | 2/2000 | Krech | 156/279 |
| 6,041,533 A | * | 3/2000 | Lemmond, Jr. | 40/584 |
| 6,082,061 A | * | 7/2000 | Ryan | B29C 45/14 |
| | | | | 52/182 |
| 6,358,621 B1 | * | 3/2002 | Hughes et al. | 428/489 |
| 6,419,610 B1 | * | 7/2002 | Jonas et al. | 482/35 |
| 6,488,444 B2 | * | 12/2002 | Licata | E02D 29/12 |
| | | | | 405/52 |
| 6,726,952 B1 | * | 4/2004 | Dimond | B05C 19/04 |
| | | | | 427/157 |
| 7,897,233 B2 | * | 3/2011 | Esposito et al. | 428/67 |
| 2003/0026951 A1 | * | 2/2003 | Okuyama | 428/156 |
| 2003/0041956 A1 | * | 3/2003 | Pigott | B29C 47/0002 |
| | | | | 156/244.11 |
| 2003/0049407 A1 | * | 3/2003 | Kacher | A47L 13/16 |
| | | | | 428/100 |
| 2003/0182880 A1 | * | 10/2003 | Weaber | B27M 3/04 |
| | | | | 52/179 |
| 2005/0009943 A1 | * | 1/2005 | MacQueen et al. | 522/71 |
| 2005/0260387 A1 | * | 11/2005 | Lux | 428/143 |
| 2006/0182983 A1 | * | 8/2006 | Paul et al. | 428/500 |
| 2007/0125601 A1 | * | 6/2007 | Lutze | 182/222 |
| 2007/0172637 A1 | * | 7/2007 | Hayes et al. | 428/220 |
| 2007/0277450 A1 | * | 12/2007 | Raulie | B32B 25/00 |
| | | | | 52/90.1 |
| 2010/0251627 A1 | * | 10/2010 | Kay | 52/28 |

FOREIGN PATENT DOCUMENTS

| | | |
|---|---|---|
| KR | 940005231 B1 | 6/1994 |
| WO | WO 2006115382 A1 | 11/2006 |

OTHER PUBLICATIONS http://liveweb.archive.org/http://www.flinttrading.com/getdoc/b5693268-f353-4ed6-ab10-af026ebd416c/Application-Instructions_PreMark-2-Layer-Stencils.aspx, reviewed on May 28, 2015, 5 pages.
http://web.archive.org/web/20091124065120/http://www.flinttrading.com/products/premark/accessibility.aspx, retrieved on May 28, 2015, 2 pages.

* cited by examiner

ANTI-SLIP STEP TREATMENT

CROSS REFERENCE TO RELATED APPLICATIONS

This application is the US, National Stage entry of International Application Number PCT/GB2012/000639 filed under the Patent Cooperation Treaty having a filing date of Aug. 7, 2012, which claims priority to GB Patent Application Number 1113722.1 having a filing date of Aug. 10, 2011.

This invention relates to anti-slip step treatment.

Conventional anti-slip step treatment involves the application of a high-friction material at or near the nose of the step. The attachment of the material must be secure, or it might loosen and itself become a trip or slip hazard. To this end, the material is often in the form of a strip that is secured in a groove, sometimes even a dovetail groove, routed into the step. In other arrangements, the material is in the form of a mat that is secured adhesively and/or with screws to cover essentially the whole of the step. Such arrangements are expensive, requiring routing or drilling operations on each step, rendering the cost, especially where there are vary many steps, such as football and other sports stadia with concrete steps, prohibitive.

Thin, coloured thermoplastic sheet materials are available particularly for application to playgrounds and other public areas, car parks and entrances to buildings, which are thermally fused to the surface by use of a hot gas jet. The materials can be supplied in preformed shapes from which games areas, for example, hopscotch or snakes and ladders, and other designs including company logos, can be laid out, or in sheets and strips from which custom designs can be constructed. Adjacent shapes will fuse together under the jet as they are fused to the substrate. The material per se is not, or not particularly, high friction. Although it may be supplied with embedded grit or glass particles, these lose at least some of their effectiveness in the process of fusing the material to the surface. However, particles may be sprinkled on top while the material is still hot and plastic to provide an effective and long-lasting anti-slip surface.

While this—essentially decorative—surface treatment is ideal for application to extended flat surfaces, such as playgrounds, it is not promoted for application to small areas. As an anti-slip provision for steps, it would still be expensive, and particularly so for concrete steps as a pre-treatment with a primer is required for effective bonding.

What could make the treatment viable would be to use it as a medium for advertising or promotion. However, laying out a small-scale design from multiple pieces of material, which would essentially amount to a mosaic, hundreds or even thousands of times would add even further to the cost.

The present invention provides means by which heat-fused plastic sheet applied to steps may be relatively inexpensively provided with advertising, promotional or other indicia.

The invention comprises, in one aspect, a method for providing anti-slip surfaces for steps in a flight of steps comprising providing for each of at least some of the steps a thermoplastic material sheet matrix and an appliqué of a contrasting material or materials, the matrix being cut out to receive the appliqué, heat fusing the matrix and appliqué to the step, the matrix and/or appliqué incorporating anti-slip material.

Thermoplastic sheet material incorporating anti-slip material, usually in the form of glass beads, gravel of flint, granite, spar, marble or bauxite. When the thermoplastic is heat fused to a surface, such anti-slip content tends to sink within the material and lose some of its effectiveness. Such materials can be obtained from Preformed Markings Ltd in Byfleet, Surrey, England or Ennis Prismo Traffic Products in Bath, England.

It is known to provide markings on kerbs, particularly above storm drains in the USA, using heat-bonded thermoplastic sheet materials, as may be seen at:

http://web.archive.org/web/20091125013853/http://www.flinttrading.com/products/premark/stormdrain.aspx, http://web.archive.org/web/20091125013853/http://www.flinttrading.com/products/premark/accessibility.aspx and http://liveweb.archive.org/http;//www.flinttrading.com/getdoc/b5693268-f353-4ed6-ab10-af926ebd416c/Application-Instructions_Premark-2-Layer-Stencils.aspx.

These markings consist of a solid base layer and a top layer. The base layer is applied to the kerb first, and then the top layer applied over the base layer, to cover it. The top layer is a stencil design contrasting in colour to the base layer, and allowing the base layer colour to show through to reveal a warning, for example, not to put things down the drain. The top layer may contain anti-slip particles, but, as mentioned, they tend on fusing to sink in the thermoplastic.

The stencil is very limiting as far as design is concerned, and cannot generally be used to replicate logos and text as required for promotional purposes. Only two colours can be accommodated. It is also wasteful of expensive thermoplastic, requiring two layers, with only a minor portion of one cut out, and requires two separate application stages, making installation time consuming.

By using a matrix and an appliqué, only a single layer of plastics material is used, the matrix layer being cut out to receive the appliqué, and the application can be completed in a single stage. More than one colour can be accommodated in the appliqué, and there is much greater scope for design.

The contrasting material may itself comprise the same material as the matrix, but in a contrasting colour or colours.

The contrasting material may be different from that of the matrix, and may, for example, be of metal such as aluminium or steel, or may be of another plastics material. It may be of anti-slip material or not, but in the latter case should make up a minor proportion, preferably less than one third, of the area of the whole.

The insert may comprise a single component, or may comprise multiple components, which may be pre-assembled into a unit for insertion into the matrix. Pre-assembly may involve a temporary adhesive bonding between components or assembly on a sacrificial scrim or in a sacrificial or durable frame as in cloisonné ware.

The appliqué may be secured to the matrix before the matrix is applied to the step, and may be temporarily secured therein as by being a tight fit or by adhesive.

The matrix and/or appliqué may incorporate luminescent material, such as fluorescent or phosphorescent material, which glows for a time after being illuminated, for example by stadium lighting, to provide emergency escape provision in the event of lighting failure.

The invention also comprises an appliqué adapted for use in such a method, and an appliqué when incorporated with a matrix for application to a step, and a step when provided with an anti-slip surface comprising such appliqué.

The matrix and/or the appliqué may be of plastics material incorporating glass beads or other particles for anti-slip purposes. Such particles, particularly of glass or flint, so as not to discolour the surface, may in any event be applied to the surface while still molten from the heat fusing stage.

The invention is of particular interest in connection with sports and other stadiums, where it would be desirable to provide an anti-slip surface to steps, but where there are so many steps that any such provision would be very expensive, and, for some stadiums, such as those of lower division football clubs, prohibitively so. By incorporating promotional material in the surface, much if not all of the cost can be met by the promoter. Heat fused plastics material, particularly with added grit, can be guaranteed for a year or more and will remain viable for at least that time. Naturally, a plain surface will cost less than one with a logo, and costs can be minimized by having, say, every fourth step incorporate an appliqué, the intermediate steps being covered with just the matrix material.

Additional information can be incorporated, such as row and seat numbers.

Appliqués, anti-slip surfacing for steps and methods for applying the same will now be described with reference to the accompanying drawings, in which:

FIG. 9 is a cross-section like FIG. 8 showing particles partly sunk in.

The drawings illustrate a method for providing an anti-slip surface 11 for a step 12 of a flight of steps 31, 71, comprising providing a thin thermoplastic material sheet matrix 13 and a design appliqué 14 of a contrasting material or materials, the matrix being cut out to receive the appliqué, and heat fusing the matrix 13 and the appliqué 14 to a step 12, the matrix and/or appliqué incorporating anti-slip material 10.

Figure 8:
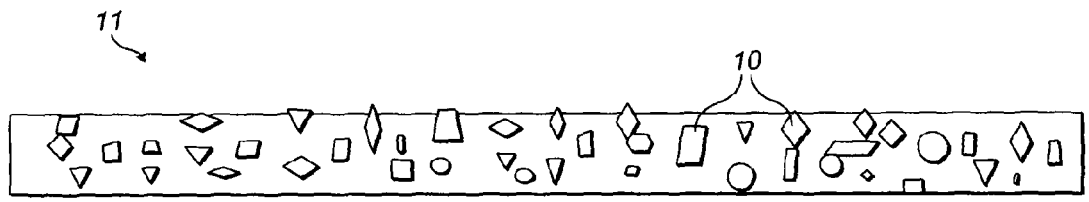
FIG. 8 is a cross section through matrix or appliqué material incorporating anti-slip particles.
Figure 9:
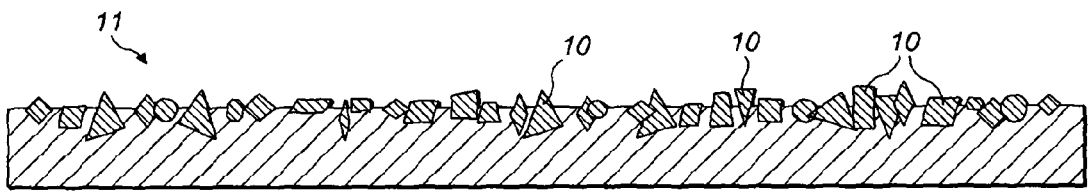

The anti-slip material 10 comprises coarse glass or flint particles that do not discolour the material. Particles 10, shown in FIGS. 8 and 9, can be incorporated in the material of either the matrix or the appliqué but tend to sink below the surface when the material melts during fusing to the step, as shown in FIG. 8. In any event, particles 10 can be sprinkled on top while the material is molten, and will only partially sink in, leaving edges standing proud of the surface to provide anti-slip properties.

The material of either matrix or appliqué may incorporate luminescent material, which can be applied by incorporation in glass particles sprinkled on while the material is molten. Phosphorescent or fluorescent will continue to glow after stadium lights are extinguished and provide indication of escape routes in the event of lighting failure.

The contrasting material may itself comprise the same material as the matrix 13, but in a contrasting colour or colours.

The contrasting material may be different from that of the matrix 13, and may, for example, be of metal such as aluminium or steel, or may be of another plastics material. It may be of anti-slip material or not, but in the latter case should make up a minor proportion, preferably less than one third, of the area of the whole.

Figure 1:
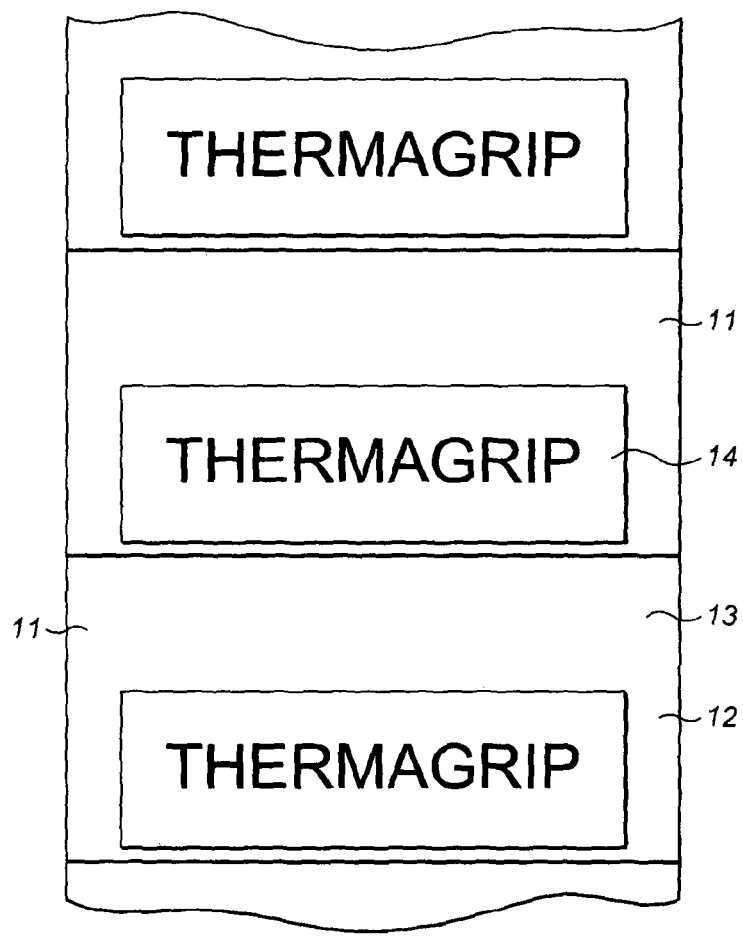
FIG. 1 is a view from above of part of a flight of steps.
Figure 2:
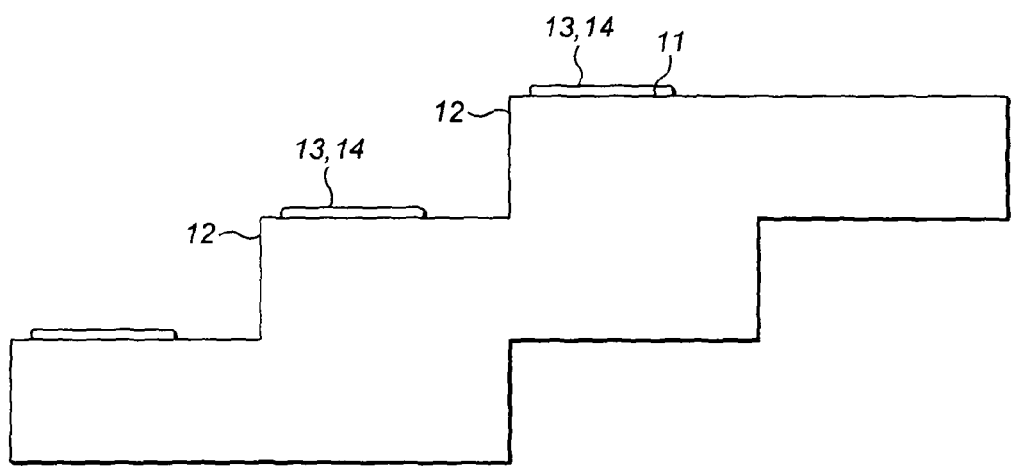
FIG. 2 is a view from the side of the steps of FIG. 1.
Figure 3:
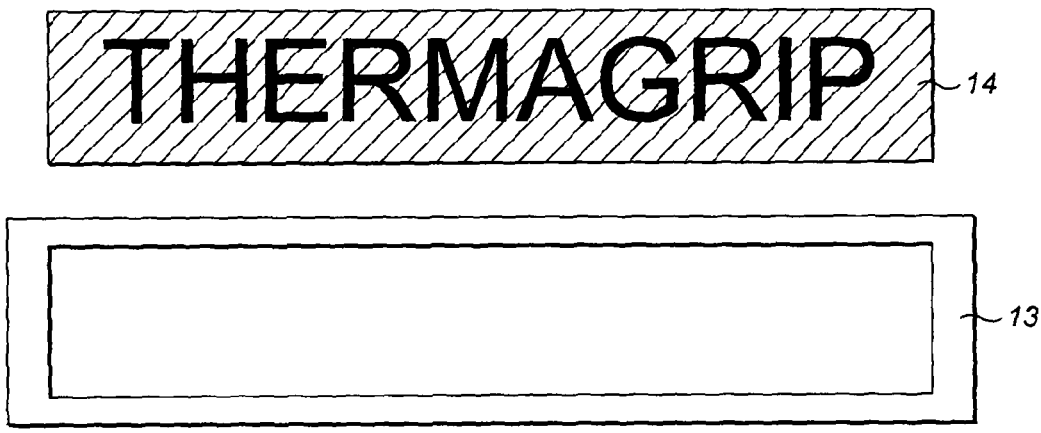
FIG. 3 is a view from above of a cut-out matrix and a first embodiment of appliqué.
Figure 4:
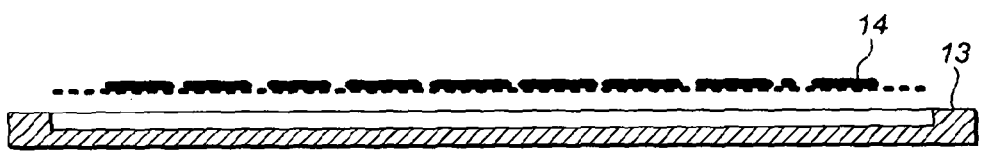
FIG. 4 is a view from the side of the matrix and appliqué of FIG. 3.
Figure 5:
FIG. 5 is a view from above of another embodiment of appliqué.
Figure 6:
FIG. 6 is a view from the side of the appliqué of FIG. 5.

In FIGS. 3 to 6 the appliqué 14 comprises multiple components, which are pre-assembled into a unit for insertion into the matrix. Pre-assembly may involve a temporary adhesive bonding between components or, as illustrated in FIGS. 3 and 4 assembly on a sacrificial scrim or in a sacrificial or durable frame, FIGS. 5 and 6, where the letters are welded to a bar 15, as in cloisonné ware. The matrix 13 is recessed or cut or stamped out to receive a part or full depth appliqué insert.

The appliqué 14 may be applied to the matrix 13 before the matrix is applied to the step, and may be temporarily secured therein as by being a tight fit or by adhesive, or it may be applied after the matrix 13 is placed on the step 12.

Figure 7:
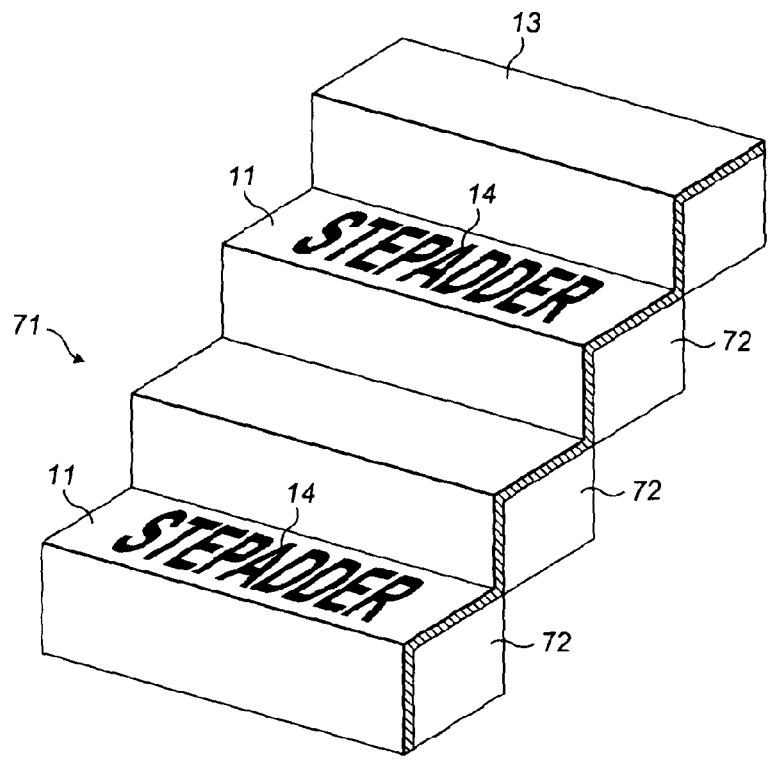
FIG. 7 is a perspective view of a flight of steps provided with anti-slip surfaces according to the invention.

FIG. 7 is a perspective view of a flight 71 of steps 72, of which every other step has an anti-slip surface 11 incorporating an appliqué 14, intermediate steps having a plain anti-slip surface of just the matrix 13 material. The spacing of the appliquéd steps can, of course, be different—every fourth or fifth step would usually be appropriate.

The invention claimed is:

1. A method for providing anti-slip surfaces for steps in a flight of steps, the method comprising:
    providing for the steps a thermoplastic material sheet matrix and an applique;
    the applique being made of a first material and comprising a plurality of insert components;
    the matrix being made of a second material and comprising a receiving portion configured to receive therein the plurality of insert components of the applique;
    wherein the first material is different than the second material;
    applying the plurality of components of the applique to the receiving portion of the matrix and temporarily securing the plurality of components in the receiving portion;
    applying the matrix and the applique to a step of said steps; and
    together heat fusing the matrix to the step of said steps and the applique to the matrix, thereby forming one unit comprising a top surface.

2. The method according to claim 1, in which the matrix, the applique or each of the matrix and the applique include an anti-slip material comprising particles.

3. The method according to claim 2, in which the particles are applied to a surface of at least one of the matrix and the applique during the heat fusing of the matrix to the step.

4. The method according to claim 1, in which the applique comprises a single component.

5. The method according to claim 1, in which the applique comprises multiple individual components.

* * * * *